US010007734B2

(12) United States Patent
Burns et al.

(10) Patent No.: US 10,007,734 B2
(45) Date of Patent: *Jun. 26, 2018

(54) REAL TIME DOCUMENT PRESENTATION DATA SYNCHRONIZATION THROUGH GENERIC SERVICE

(75) Inventors: Charles Burns, Redmond, WA (US); Jade Bissat, Seattle, WA (US); Apeksha Godiyal, Bellevue, WA (US); Subalakshmi Venugopal, Bellevue, WA (US); Abraham Mathew, Edmonds, WA (US); Hani Saliba, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/286,432

(22) Filed: Nov. 1, 2011

(65) Prior Publication Data
US 2013/0110937 A1    May 2, 2013

(51) Int. Cl.
G06F 15/16    (2006.01)
G06F 17/30    (2006.01)
H04L 29/06    (2006.01)
G06Q 10/10    (2012.01)
H04L 12/18    (2006.01)

(52) U.S. Cl.
CPC .... *G06F 17/30873* (2013.01); *G06F 17/3089* (2013.01); *G06Q 10/103* (2013.01); *H04L 12/1822* (2013.01); *H04L 29/06401* (2013.01); *H04L 65/4015* (2013.01)

(58) Field of Classification Search
CPC ........... H04L 65/4015; H04L 29/06401; H04L 12/1813–12/1822

USPC ........................... 709/204–207; 715/751–759
See application file for complete search history.

(56) References Cited

U.S. PATENT DOCUMENTS 7,634,533 B2 * 12/2009 Rudolph et al. .............. 709/203
7,899,863 B2    3/2011 Caspi et al.
7,904,537 B2 *  3/2011 Lim et al. ..................... 709/223
(Continued)

FOREIGN PATENT DOCUMENTS

CN    1694527 A    11/2005
CN    1873672 A    12/2006
(Continued)

OTHER PUBLICATIONS

"Advanced PowerPoint synchronization", Retrieved at <<http://eng.feedbackitalia.it/manual/manual_eng/default.htm?turl=Word-Documents%2Fadvancedpowerpointsynchronization.htm>>, Retrieved Date: Nov. 1, 2011, p. 1.
(Continued)

Primary Examiner — Brendan Higa

(57) ABSTRACT

A generic means for synchronizing information about a user's view of a document or other content within an application across native client and web applications is provided. Attendees of an online broadcast are enabled to see what the presenter is seeing within their own application. In addition, meeting-specific information such as the meeting time and notes may be synchronized enabling nearly real time synchronization. Moreover, by enabling attendees to view the presented document within their own applications, the attendees are afforded the capabilities provided by that application, such as navigating through the document manually.

20 Claims, 6 Drawing Sheets

(56) References Cited

U.S. PATENT DOCUMENTS

| | | | |
|---|---|---|---|
| 8,473,571 B2* | 6/2013 | Penner et al. | 709/217 |
| 2004/0080504 A1 | 4/2004 | Salesky et al. | |
| 2005/0154637 A1* | 7/2005 | Nair | G06Q 30/02 705/14.4 |
| 2005/0262201 A1* | 11/2005 | Rudolph et al. | 709/205 |
| 2006/0026502 A1 | 2/2006 | Dutta | |
| 2006/0073462 A1* | 4/2006 | Tetreault | G09B 7/02 434/322 |
| 2006/0167996 A1* | 7/2006 | Orsolini et al. | 709/204 |
| 2006/0167997 A1 | 7/2006 | Forstadius | |
| 2006/0184872 A1* | 8/2006 | Dontcheva et al. | 715/512 |
| 2006/0235927 A1* | 10/2006 | Bhakta et al. | 709/204 |
| 2007/0083597 A1* | 4/2007 | Salesky et al. | 709/204 |
| 2007/0200921 A1 | 8/2007 | Horikiri | |
| 2007/0282948 A1* | 12/2007 | Praino et al. | 709/204 |
| 2008/0005233 A1 | 1/2008 | Cai et al. | |
| 2008/0082531 A1 | 4/2008 | Suarez | |
| 2008/0168137 A1* | 7/2008 | Benza | G06Q 10/10 709/204 |
| 2008/0276159 A1* | 11/2008 | Narayanaswami | G06F 17/241 715/202 |
| 2009/0063945 A1 | 3/2009 | Bhogal et al. | |
| 2009/0265487 A1* | 10/2009 | Zhang et al. | 710/61 |
| 2009/0287668 A1 | 11/2009 | Evans et al. | |
| 2009/0307176 A1 | 12/2009 | Jeong et al. | |
| 2010/0174773 A1* | 7/2010 | Penner et al. | 709/203 |
| 2010/0257449 A1* | 10/2010 | Lieb et al. | 715/730 |
| 2010/0257456 A1* | 10/2010 | Lieb et al. | 715/741 |
| 2010/0274796 A1 | 10/2010 | Beauregard et al. | |
| 2010/0318520 A1* | 12/2010 | Loeb | G06F 17/30056 707/743 |
| 2011/0231399 A1 | 9/2011 | Zhang et al. | |
| 2011/0302163 A1 | 12/2011 | Rhinelander et al. | |
| 2011/0307788 A1* | 12/2011 | Cheung | G06Q 10/10 715/731 |
| 2012/0182384 A1* | 7/2012 | Anderson et al. | 348/14.09 |
| 2012/0296914 A1* | 11/2012 | Romanov et al. | 707/741 |

FOREIGN PATENT DOCUMENTS

| | | |
|---|---|---|
| CN | 101999110 A | 3/2011 |
| EP | 1592198 | 11/2005 |
| JP | 2000-092217 | 3/2000 |
| JP | 2010-067108 | 3/2010 |
| JP | 2011-065288 | 3/2011 |
| RU | 2345402 C2 | 1/2009 |

OTHER PUBLICATIONS

"Web conferencing at glance", Retrieved at <<http://talkingcommunities.com/features.htm>>, Retrieved Date: Sep. 15, 2011, pp. 3.
"Quick Guide for easymeeting™", Retrieved at <<http://www.feedbackitalia.com/docs/easymeeting_quickguide_eng_6.1.pdf>>, Retrieved Date: Sep. 15, 2011, pp. 2.
PCT International Search Report and Written Opinion in Application PCT/US2013/020185, dated Apr. 26, 2013, 9 pgs.
PCT International Search Report in Application PCT/US2012/062886, dated Apr. 26, 2013, 4 pgs.
"First Office Action and Search Report Issued in Chinese Patent Application No. 201210429554.4", dated Jan. 4, 2015, 18 Pages.
European Extended Search Report in Application 12845821.3, dated Jun. 3, 2015, 8 pgs.
European Communication in Application 12845821.3, dated Jun. 19, 2015, 1 page.
Chinese 2nd Office Action and Search Report in Application 201210429554.4, dated Aug. 14, 2015, 18 pgs.
"Third Office Action Issued in Chinese Application No. 201210429554.4", dated Feb. 19, 2016, 6 Pages.
Chinese Office Action in Application 201210429554.4, dated May 26, 2016, 14 pages.
Australian Office Action in Application 2012332511, dated Oct. 14, 2016, 5 pgs.
Japanese Office Action in Application 2014-540052, dated Nov. 7, 2016, 15 pgs.
Office Action Issued in Russian Patent Application No. 2014117166, dated Jul. 5, 2016, 7 Pages.
Office Action Issued in Russian Patent Application No. 2014117166, dated Mar. 4, 2016, 7 Pages.
Russian Notice of Allowance in Application 2014117166, dated Dec. 26, 2016, 16 pgs.
Chinese Office Action mailed in Application No. 201210429554.4, dated Feb. 23, 2017, 15 Pages.
"Decision on Reexamination Issued in Chinese Patent Application No. 201210429554.4", dated Oct. 31, 2017, 19 Pages.

* cited by examiner

REAL TIME DOCUMENT PRESENTATION DATA SYNCHRONIZATION THROUGH GENERIC SERVICE

BACKGROUND

Increasingly documents and other digital content are being shared over the Internet or other similar private networks. Typically, a presenter initiates an online meeting with one or more other users, and generates content, which the presenter may desire to share with one or more attendees of an online meeting. In a typical online meeting, shared content is transmitted from the presenter (usually through a server) to the attendees similar to a video stream, where the flow of presentation is controlled by the presenter. Thus, attendees have a passive role of viewing the presented material at the presenter's pace and direction.

Conventional presentations typically include slide shows, audio media, or video media. Screen sharing is another common technique. In screen sharing, the entire contents of the presenters screen or application is graphically transmitted to the attendees. Attendees cannot interact with the screen. Some applications allow an attendee to take control, but this is only one-at-a-time and it affects the experience of all attendees. While different content types may be used in an intermixed fashion, the overall presentation is usually subject to a single direction flow controlled by the presenter. Furthermore, online presentations are typically initiated through an online meeting application and presented content is embedded into a presentation user interface through various ways. For example, if a word processing document or a spreadsheet document is used as part of the content, their respective contents are imported into the presentation leaving only the look of the document from its native application. None of the capabilities of the native application are inherited in the presentation.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a generic means for synchronizing information about a user's view of a document or other content within an application across native client and web applications, allowing attendees of an online broadcast to see what the presenter is seeing within their own application. In addition, meeting-specific information such as the meeting time and notes may be synchronized enabling nearly real time synchronization. Moreover, by enabling attendees to view the presented document within their own applications, the attendees are afforded the capabilities provided by that application, such as navigating through the document manually and independently such that actions taken by an attendee do not impact the experience of other attendees in the meeting.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
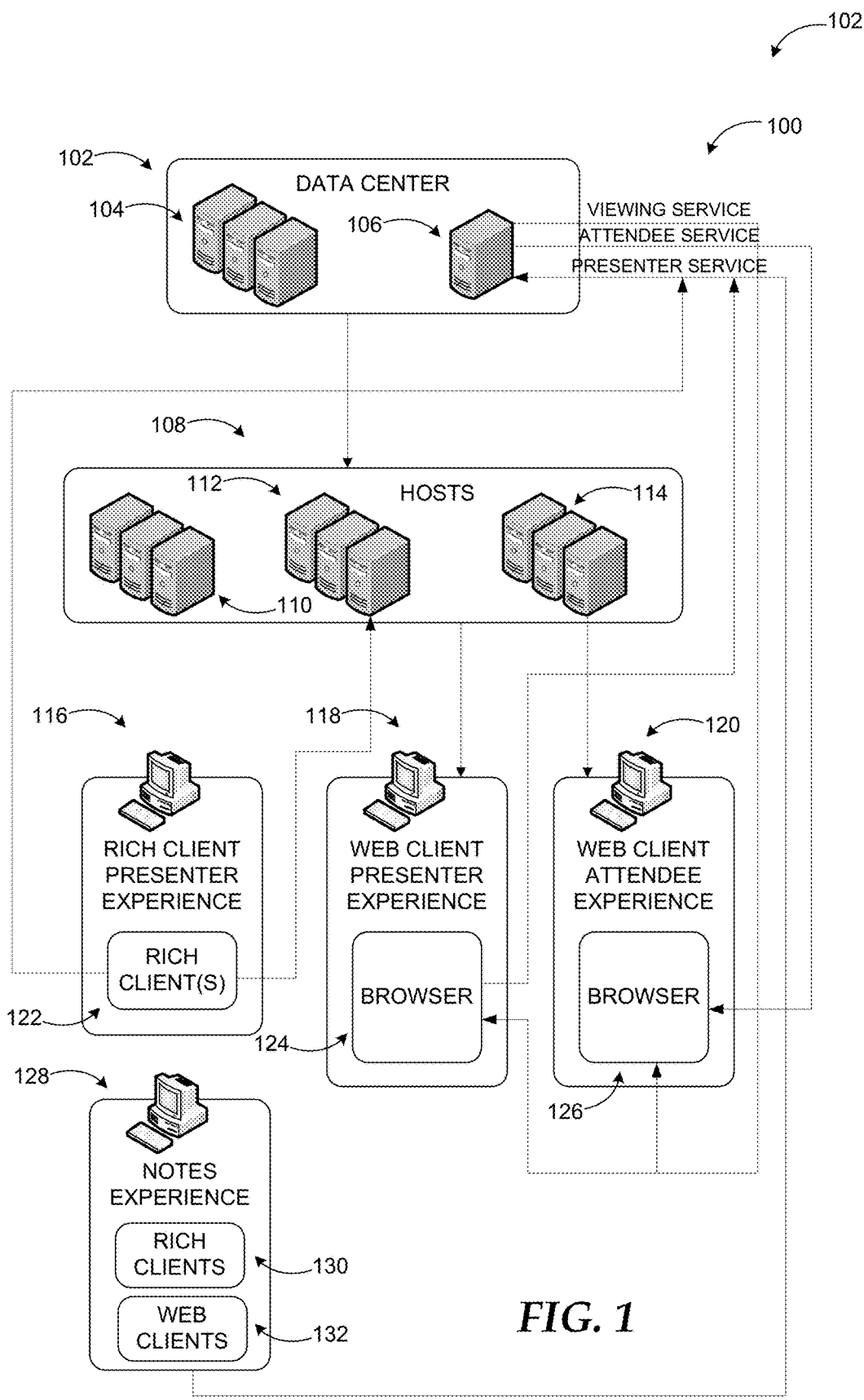
FIG. 1 illustrates an example architecture of a system providing real time document presentation data synchronization according to embodiments.

As briefly described above, information regarding a presenter's current view of the document may be synchronized between the presenter and attendees in order to share a view in real time and allow attendees to follow along with the presenter as they move through the document. Additionally users may be afforded all the capabilities provided by a native application on their client machines through which they view a presented document such as navigating through the document manually.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents. While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for enabling real time document presentation data synchronization through generic service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example architecture of a system providing real time document presentation data synchronization according to embodiments. As illustrated in diagram 100, multimodal online communication services 110, online collaboration services 112, and web services 114 may act as hosts 108, where an online meeting with real time document presentation data synchronization experience is hosted. Hosting may be achieved using public interfaces. Hosts 108 may be able to communicate with the presenter and attendee experiences (116, 118 and 120) exposed by a content sharing service 106 by implementing the public interfaces. Hosts 108 may support the interfaces for a viewing service and a broadcasting functional set. Hosts 108 that support these interfaces may also host the presenter and attendee experiences inside their own web pages or inside a control for rich client applications 122.

In some embodiments, hosts 108 may not control the user experience, but simply load (or reload) the presenter or attendee frames. The content sharing service 106 may provide different modes for these pages—for example, a full mode with all user interfaces and an embedded mode, which shows minimal user interface and allows the host to respond to key events. A presenter service and an attendee service may be exposed by the content sharing service 106. These may be called by the rich clients 122 when presenting and by the attendee web pages (browser 126). Hosts 108 may also be able to call these services.

The rich clients 122 often provide a high fidelity user experience for the presenter. For example, when using a presentation document (e.g., a PowerPoint® document by Microsoft Corp. of Redmond, Wash.), the presenter may be offered a number of controls, as well as highly attractive transitions and animations. The content sharing service 106, which is located at data center 102 along with application services 104, may allow a presenter to stay in their preferred experience—rich client or web clients—and have full control of the broadcast. To enable this, content sharing service 106 may expose the presenter service, which may include functions for starting and stopping a broadcast session and for uploading the current state of the presentation.

According to some embodiments, the rich clients may also be viewed as attendee experience as well, as long as the rich clients provide ways of synchronizing their state to the current state of the content sharing data. Other scenarios, which may involve rich client participation, may include a note taking feature (notes experience 128). Through rich clients 130 and web clients 132 within notes experience 128, the notes may be hyperlinked to the document being broadcast. Since the document and its current state are known, rich hyperlinks and connections between notes and broadcast documents can be established. This may be accomplished by exposing the attendee service with functions for joining an ongoing broadcast session and for retrieving the current state of the presentation.

Hosts 108 may ensure data integrity of the file giving the presenter the confidence that they are presenting the document in its current state and that it will remain unchanged for the duration of the broadcast. One way to accomplish this is to make a copy of the file and broadcast that copy. The host may implement an interface, and the rich clients may use it to make the copy and upload the file. Hosts 108 may also choose to use an alternate mechanism to ensure data integrity.

According to other embodiments, attendees may be allowed to navigate the document independent of the presenter, and the state of each attendee may be tracked. Furthermore, identities of the attendees, the location of private notes being taken, etc. may also be tracked. For example, annotation support, allowing participants to view ink and other comments shared in real time, may be provided and data associated with annotation may be synchronized as well.

For every document being synchronized, content sharing service 106 may track the current state such as a page, slide, paragraph, line on which the presenter is at a given time point. Current state may also include information associated with other content such as at what point of an audio or video media presentation the presenter is (positional information), a position of an animation feature, a cell/row/column of a presented table, etc. State information may be stored and tracked for ongoing meetings. Thus, the state store may be an in-memory storage of a server and last for the duration of the meeting, (and maybe for a short period after the end of the meeting). Some of the state data may be constantly changing (e.g., which slide the presenter if on), whereas some state data may be fixed (e.g., the name and location of the original file being presented).

The state store may be a resilient store to recover from server failures and reboots. This may be accomplished by the clients pinging the present service at regular intervals, so if a particular back end server goes down, the load balancer may redirect requests to a new back end machine which may then get rehydrated with the meeting state on the next ping from the presenter's rich client. The amount of data for rehydration is small, and always available. Furthermore, an existing attendee to the broadcast session may not experience an interruption in their broadcast (i.e. their screen will not go blank for instance, they will still see the latest successfully stored and retrieved state, until a new machine is back up and hydrated with a new state).

Figure 2:
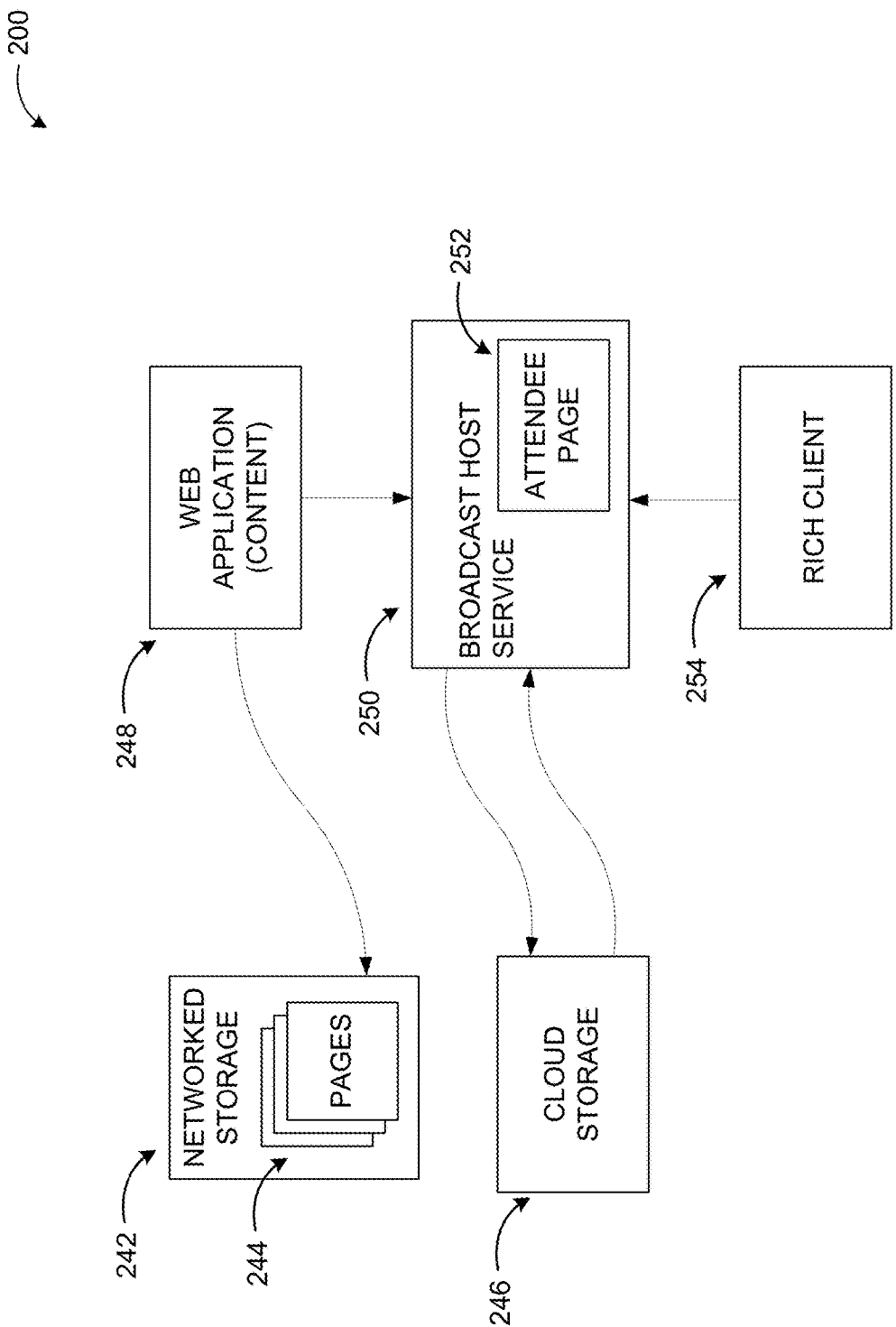
FIG. 2 illustrates major components and their interactions in an example system for enabling in real time document presentation data synchronization.

FIG. 2 illustrates major components and their interactions in an example system for enabling in real time document presentation data synchronization. As demonstrated in diagram 200, web application 248 may provide the content to be broadcast to networked storage 242 as exemplified by pages 244. Broadcast host service 250 may initiate a broadcast session simply by loading a presenter page and providing the link to the file to be broadcast.

Presenter's rich client 254 may then send state updates as to the status of the presentation. Attendees may load attendee page 252, which may include the respective web application component associated with the presented document type (e.g., presentation application, word processing application, spreadsheet application, note taking application, etc.). The component may load the broadcast document via a public interface from cloud based storage 246 and the attendee may poll for updated state as the broadcast continues.

Thus, the server does not store the broadcast document, but stores the current state of the presentation in a temporary store. Under regular circumstances, the state information may be sent from the presenter to the server and subsequently to the attendees as the state changes at the presenter's client application. To ensure resilience of the broadcast in case of server failure, the state information may also be sent periodically to the server such that a backup server can be brought up to speed quickly after taking over the role of a failed server without interrupting the online presentation. The scenarios and configuration shown in FIG. 2 are for illustration purposes only and do not constitute a limitation on embodiments.

Figure 3:
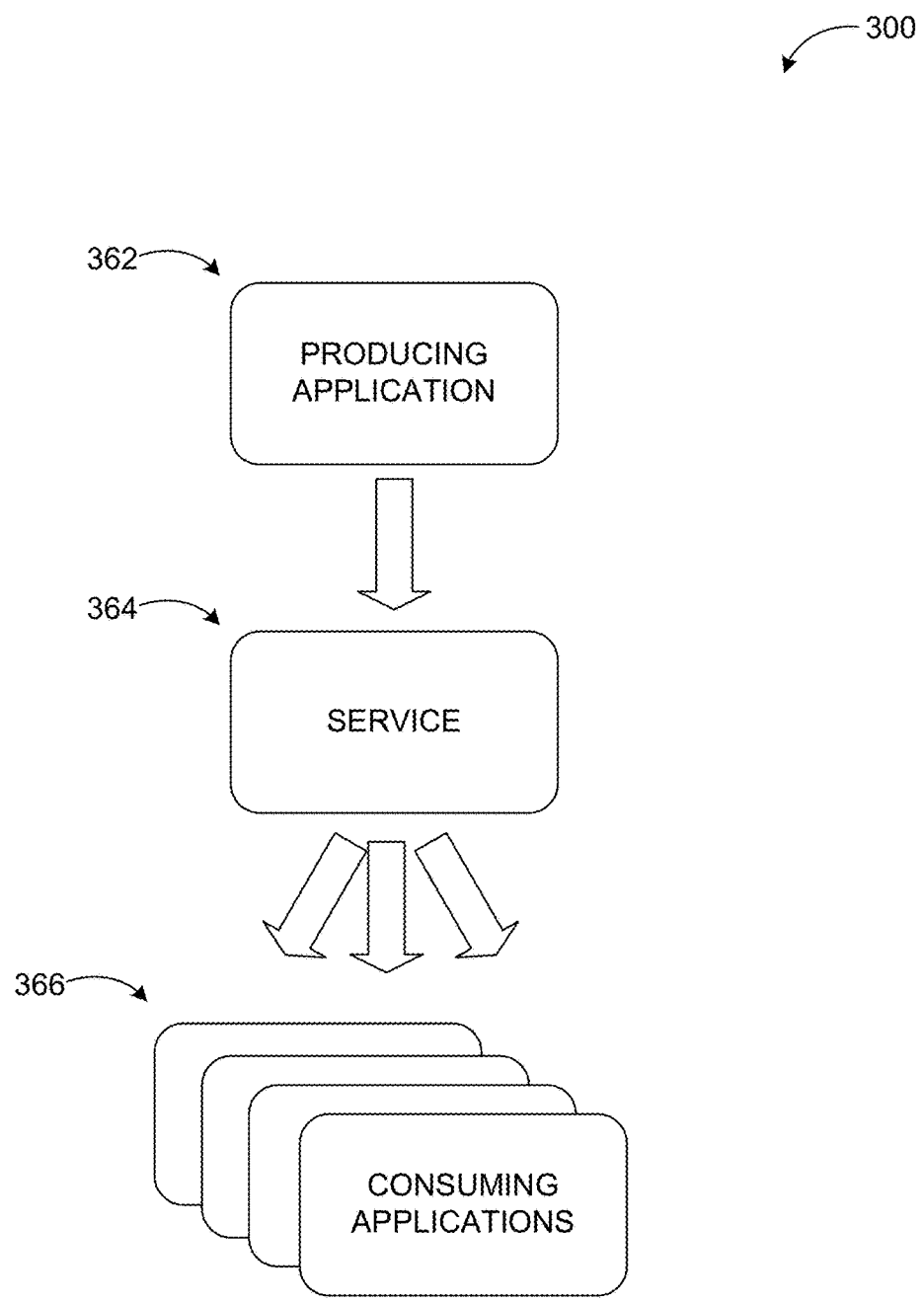
FIG. 3 illustrates a conceptual diagram of presented document flow in an example system according to embodiments.

FIG. 3 illustrates a conceptual diagram 300 of presented document flow in an example system according to embodiments. In a system according to embodiments, the information that needs to be synchronized for the application(s) in question may be first defined. Then, a data structure or other means of representing that information may be created, as well as any additional information needed for the exchange process to function. The applications 362, 366 producing and consuming the information may be checked to verify that they are capable of doing so. Next, a web service 364 or other means of exchanging the information between multiple applications may be created.

The data that needs to be synchronized may depend on the application and type of content in question. For example, in a presentation document a current slide number and a current animation step may be needed for synchronization in order for an attendee to follow a presenter's place in the document. Similarly, in a word processing document, a page/paragraph/line currently being presented by the presenter may be included in the state data.

After determining what data needs to be synchronized, an implementer may determine how to represent this data. The state data may be modeled as a data structure, but it may also be represented in another form. The applications 362, 366 used by the presenter and attendees need to be capable of creating and consuming the relevant data respectively. The applications may be native applications or web applications. In order to exchange the data between applications, service 364 or a similar entity may be created. Service 364 needs to be capable of being contacted by applications from different locations, and support both uploading new meeting data and retrieving meeting data. Service 364 also needs to be able to store meeting data for a given piece of content in some form for a period of time. The data may be stored in different ways—on disk, in memory, etc.

In some embodiments, authentication and/or authorization of attendees may be performed prior to transmitting state data. In other embodiments, a host may be enabled to inform at some point during the broadcast that a presenter may be "bad" and should not be trusted. At that point, the presenter's permission rights may be updated and according actions taken. Furthermore, in an online broadcast according to embodiments, presenters may switch. Since the presentation is viewed on client side based on the state data, the broadcast may continue without interruption even when the presenter changes. Following a state data transmission from one presenter, the next state data may come from another presenter making the transition seamless to the attendees. In such cases, the state data may also include an identification of the presenter to identify to the attendees the new presenter.

In a system according to embodiments, any type of content may be broadcast with real time document presentation data synchronization. For example, word processing documents, spreadsheet documents, presentation documents, audio media, video media, graphic presentations, even email or similar textual and/or graphical documents may be broadcast using state data to synchronize attendees with a presenter.

The example systems in FIG. 1 through 3 have been described with specific configurations, applications, and interactions. Embodiments are not limited to systems according to these examples. A system for enabling real time document presentation data synchronization may be implemented in configurations employing fewer or additional components and performing other tasks. Furthermore, specific protocols and/or interfaces may be implemented in a similar manner using the principles described herein.

Figure 4:
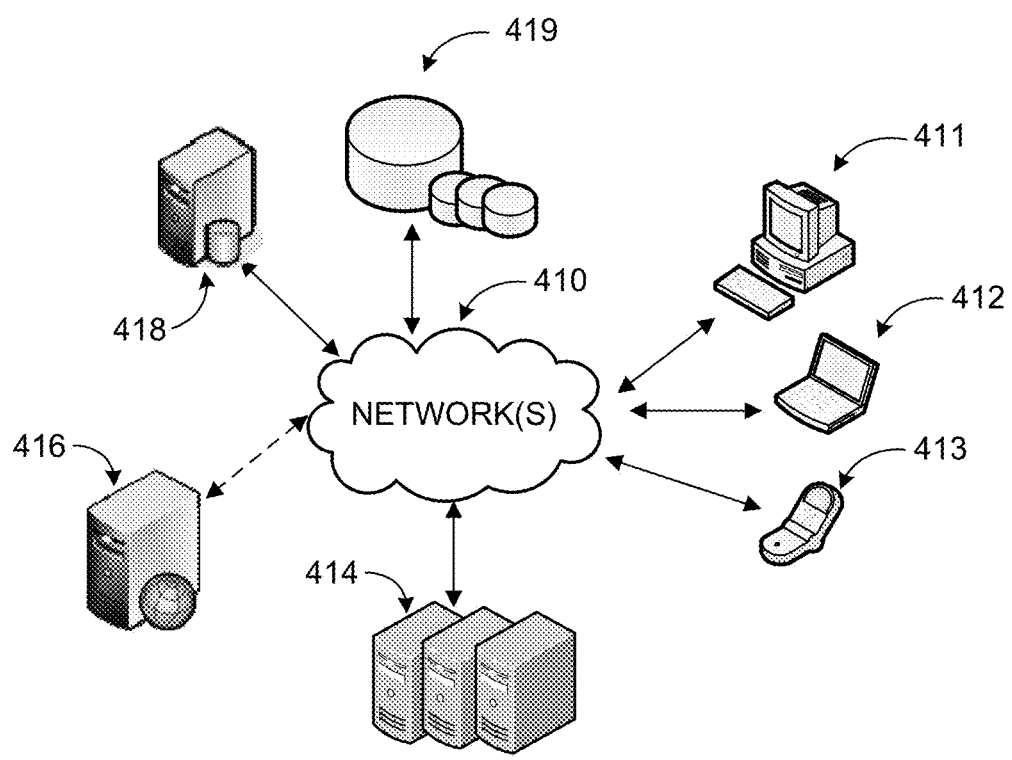
FIG. 4 is a networked environment, where a system according to embodiments may be implemented.

FIG. 4 is an example networked environment, where embodiments may be implemented. A system for enabling real time document presentation data synchronization through generic service may be implemented via software executed over one or more servers 414 such as a hosted service. The platform may include a web-based service or application, a cloud based service or application, and similar ones, and communicate with client applications on individual computing devices such as a smart phone 413, a laptop computer 412, or desktop computer 411 ('client devices') through network(s) 410. One example of a web-based service may be a productivity suite that provides word processing, spreadsheet, communication, scheduling, presentation, and similar applications to clients through a browser interface on client devices. Such a service may enable users real time document presentation data synchronization as described above.

Client applications executed on any of the client devices 411-413 may facilitate communications via application(s) executed by servers 414, or on individual server 416. An application executed on one of the servers may facilitate broadcast of presentation content and state information from a presenter. Attendees using client devices 411-413 may view, navigate, and control a flow of content using their native applications on the client devices, but also re-synchronize with the presenter through the state information. The facilitating application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for enabling real time document presentation data synchronization through generic service. Furthermore, the networked environments discussed in FIG. 4 are for illustration purposes only. Embodiments are not limited to the example applications, modules, or processes.

Figure 5:
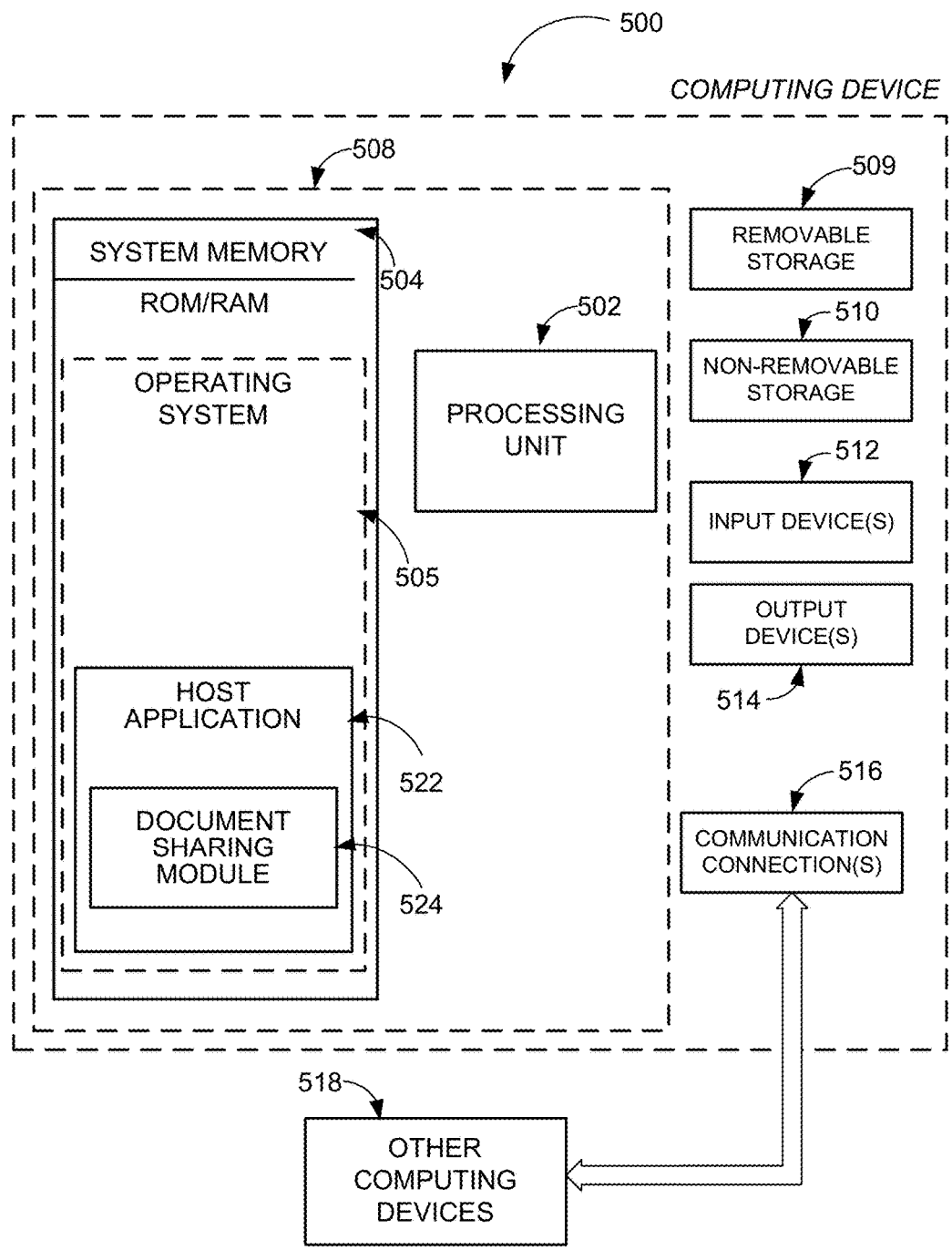
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device facilitating online broadcasting of documents with real time presentation data synchronization according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as a host application 522, and document sharing module 524.

Host application 522 may enable online broadcasting of presentation including documents and content of any type. Through the document sharing module 524, attendees of the broadcast may receive state information updates from a presenter enabling them to follow the presenters view of the presentation locally with the capability to independently navigate through the presentation, control flows, and re-synchronize with the presenter. Host application 522 and document sharing module 524 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
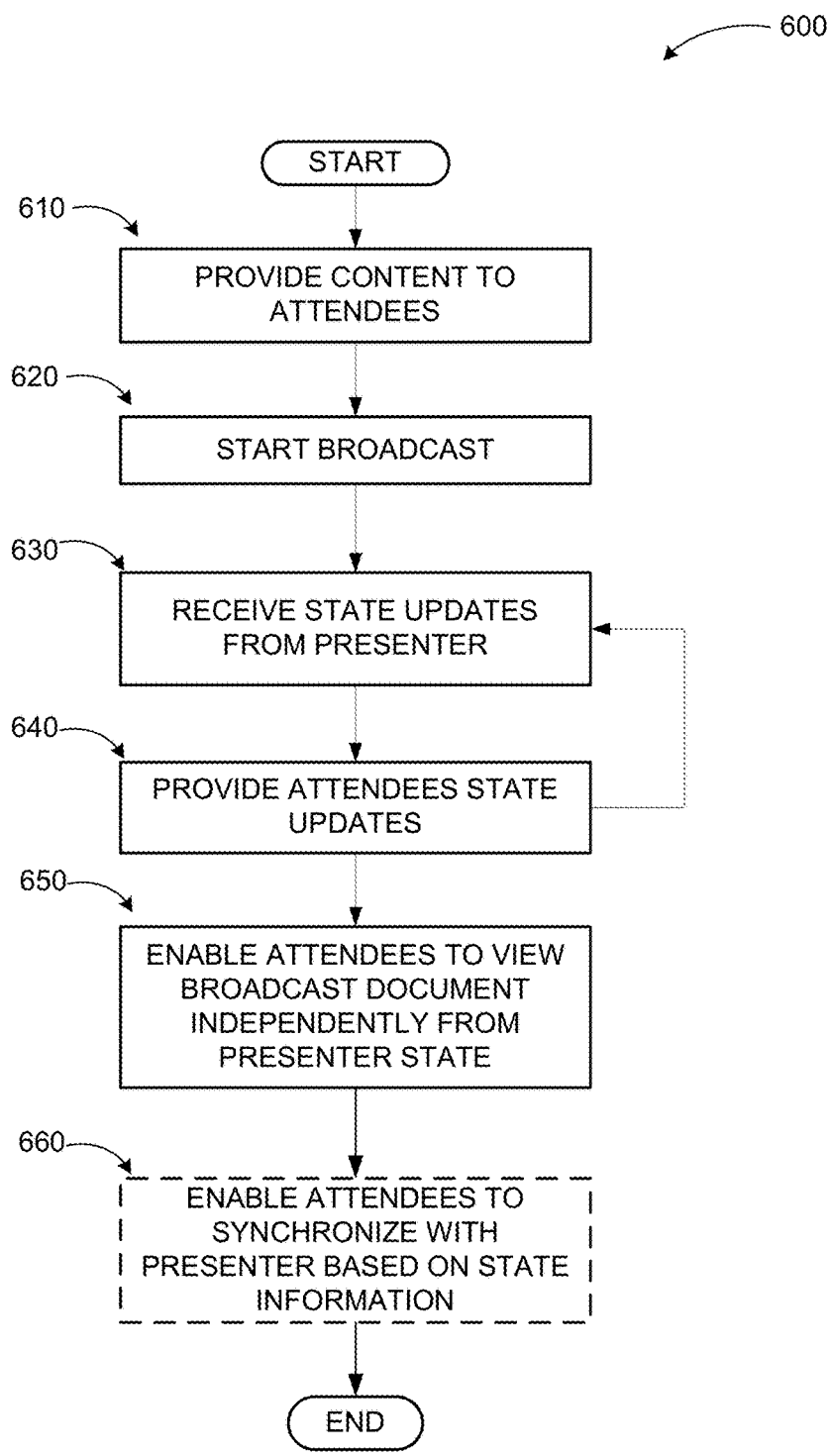
FIG. 6 illustrates a logic flow diagram for process 600 for providing real time document presentation data synchronization according to embodiments.

FIG. 6 illustrates a logic flow diagram of process 600 for providing real time document presentation data synchronization according to embodiments. Process 600 may be implemented on a computing device or similar electronic device capable of executing instructions through a processor.

Process 600 begins with operation 610, where content is provided to the attendees. The content may be uploaded to a networked storage such that it can be accessed/retrieved by client applications (rich or generic) during the broadcast session. In some embodiments, the content may be cached client side and viewed during the session. At operation 620, the broadcast session is started by one of the presenter clients (either rich or thin) by communicating with a server facilitating the online presentation. During the broadcast session, the server facilitating the online presentation receives state updates from the presenter, as shown at operation 630. The state updates may be received in response to state changes at the presenter's side or periodically to ensure resilience of the system.

At operation 640, attendees may be provided with the state updates as received from the presenter and enabled at operation 650 to view the broadcast document independently from the presenter. For example, an attendee may replay, play slower, or play faster multimedia content, change the pace of an animation, change to a different location on a word processing or spreadsheet document, and so on. Operations 630 and 640 may be executed in a loop such that updates are received from the presenter and provided to the attendees throughout the broadcast session. At optional operation 660, the attendees may be enabled to re-synchronize with the presenter using the state updates being transmitted from the server to the attendees.

From an attendee perspective, the attendee would follow a link (e.g. a URL) received from the host service, join the broadcast session, and have the document view rendered on their client device (e.g. through a browser). The attendee may receive state updates from the presenter (through the host service) periodically and/or upon changes at the presenter's side and automatically navigate the document view to stay synchronous with the presenter. The attendee may also be enabled to manually navigate the document independent from the presenter and synchronize back with the presenter based on the received state updates.

From a presenter perspective, the broadcast session may be initiated and attendees may be invited by sending them a link to the broadcast. The presenter may be enabled to navigate through the presented document, which is replayed for each attendee based on state updates sent to the attendees through the host service. The presenter may also end the broadcast at any point.

The operations included in process 600 are for illustration purposes. Real time document presentation data synchronization according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer implemented method for synchronizing presentation data in an online broadcast, the method comprising:
   providing, by a server, content to a plurality of attendees, wherein the content comprises a document navigable by each attendee in the plurality of attendees and content sharing information;
   receiving, by the server, a state information update from a presenter based on a status of the content at a client application associated with the presenter, wherein the state information update comprises information regarding the presenter's view of the content;
   storing, by the server, the state information from the presenter;
   receiving a request from one of the attendees of the plurality of attendees for the state information update;
   providing, by the server, the state information update to the one attendee, wherein providing the state information update enables an attendee client application associated with the one attendee to display the presenter's view of the content; and
   further wherein the state information includes data associated with at least one from a set of: a timing, positional information, and a flow of media as processed at the presenter's client application, and further wherein the state information includes notes associated with the online broadcast; and
   facilitating an update to the content, using the state information update, such that the content is displayed in its current state during independent navigation.

2. The method of claim 1, wherein the document is navigable based on inherited capabilities of a native application.

3. The method of claim 2, further comprising enabling the attendee to synchronize viewing of the content at the client application with the presenter using the state update information.

4. The method of claim 1, wherein the attendee client application includes one of a rich client application and a browser for accessing a web application.

5. The method of claim 4, further comprising enabling the attendee to access the content using capabilities of the rich client application.

6. The method of claim 1, wherein storing the state information includes storing the state information at an in-memory store of a server facilitating the broadcast for a duration of the broadcast.

7. The method of claim 1, further comprising receiving the state information update from the presenter in response to a change of content status at the presenter's client application.

8. The method of claim 1, further comprising receiving the state information update periodically from the presenter to enable resilience of a broadcast session in case of server failure.

9. The method of claim 1, wherein the content includes one or more of: word processing documents, spreadsheet documents, presentation documents, audio media, video media, graphic presentations, email, and textual and/or graphical documents.

10. A server for facilitating synchronization of document presentation data in an online broadcast, the server comprising:
    a memory;
    a processor coupled to the memory, the processor executing a host application, wherein the host application is configured to:
    provide content to a plurality of attendees, wherein the content comprises a document navigable by each attendee in the plurality of attendees;
    receive a state information update from a presenter based on a status of the content at a client application associated with the presenter, wherein the state information update includes information regarding the presenters view of the content and additionally includes notes associated with the online broadcast;
    store the state information from the presenter;
    receive a request from one of the attendees of the plurality of attendees for a state information update;
    provide the state information update to the attendee, further wherein the state information update allows by the client to re-synchronize with the presenter after the document has been independently navigated;
    enable the attendee, based on the state information, to view the content at the client application associated with the attendee to establish a real time synchronization between the presenter and the attendee;
    enable the attendee to navigate and control the content independently from the presenter; and
    facilitating an update to the content, using the state information update, such that the content is displayed in its current state during independent navigation.

11. The server of claim 10, wherein the server further facilitates a content sharing service configured to:
    expose a presenter service with functions for starting and stopping a broadcast session and for uploading a current state of the presentation.

12. The server of claim 10, wherein the host application is further configured to:
    enable the presenter to present from a native rich client application.

13. The server of claim 10, wherein the host application is further configured to:
    ensure data integrity of the content for providing the presenter confidence that a presented document is in its current state and that the presented document remains unchanged for a duration of the broadcast.

14. The server of claim 13, wherein the host application is further configured to:
ensure the data integrity of the content by making a copy of the content and broadcast the copy.

15. The server of claim 10, wherein the state information is modeled as a data structure.

16. The server of claim 10, wherein the host application is associated with one of: a multimodal online communication service, an online collaboration service, and a web service.

17. A computer-readable memory device coupled to a server with instructions stored on the device for synchronization of document presentation data in an online broadcast, that when executed the instructions are capable of causing a computing device to:
provide content to a plurality of attendees, wherein the content comprises a document navigable by each attendee in the plurality of attendees;
receive a state information update that includes data associated with at least one from a set of: a timing, positional information, and a flow of media as processed at a presenter's client application from the presenter based on a status of the content at a client application associated with the presenter, and further wherein the state information update includes notes associated with the online broadcast;
receive a request from the plurality of attendees for a state information update;
provide the state information update to the plurality of attendees;
store the state information from a presenter;
enable the plurality of attendees to view the content at respective client applications associated with the attendees employing the state information update to maintain a real time synchronization between the presenter and the attendees, further wherein each respective client application uses the state information update to re-synchronize with presenter after the document has been independently navigated by each of the plurality of attendees;
enable the attendees to navigate and control the content at their respective client applications independently from the presenter; and
enable, using the state information update, the content to be viewed in its current state during independent navigation.

18. The computer-readable memory device of claim 17, wherein the instructions are further capable of causing the computing device to:
in response to switching from the presenter to another presenter, continuing to receive state information updates from the other presenter, wherein the state information update further includes an identification of the other presenter.

19. The compute-readable memory device of claim 17, wherein the instructions are further capable to cause the computing device to:
ensure the data integrity of the content by making a copy of the content and broadcast the copy.

20. The compute-readable memory device of claim 17, wherein the state information is modeled as a data structure.

* * * * *

UNITED STATES PATENT AND TRADEMARK OFFICE
CERTIFICATE OF CORRECTION

Page 1 of 1

PATENT NO. : 10,007,734 B2
APPLICATION NO. : 13/286432
DATED : June 26, 2018
INVENTOR(S) : Charles Burns et al.

It is certified that error appears in the above-identified patent and that said Letters Patent is hereby corrected as shown below:

On the Title Page

Item (*) Notice: Subject to any disclaimer, the term of this patent is extended or adjusted under 35 U.S.C. 154(b) by 0 days. days. This patent is subject to a terminal disclaimer. - should read as follows:
--(*) Notice: Subject to any disclaimer, the term of this patent is extended or adjusted under 35 U.S.C. 154(b) by 0 days.--

Item (45) Date of Patent: *Jun. 26, 2018 - no terminal disclaimer was filed and should read as follows:
--(45) Date of Patent: Jun. 26, 2018--

Signed and Sealed this
Twentieth Day of November, 2018

Andrei Iancu
*Director of the United States Patent and Trademark Office*